(12) United States Patent
Ueda et al.

(10) Patent No.: US 11,872,522 B2
(45) Date of Patent: Jan. 16, 2024

(54) HUMIDITY CONTROL ELEMENT AND METHOD FOR USING THE SAME

(71) Applicant: Osaka Gas Co., Ltd., Osaka (JP)

(72) Inventors: Kentaro Ueda, Osaka (JP); Saori Sakurai, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 706 days.

(21) Appl. No.: 16/982,294

(22) PCT Filed: Feb. 26, 2019

(86) PCT No.: PCT/JP2019/007237
§ 371 (c)(1),
(2) Date: Sep. 18, 2020

(87) PCT Pub. No.: WO2019/187893
PCT Pub. Date: Oct. 3, 2019

(65) Prior Publication Data
US 2021/0023502 A1 Jan. 28, 2021

(30) Foreign Application Priority Data

Mar. 29, 2018 (JP) ................. 2018-064015

(51) Int. Cl.
*B01D 53/28* (2006.01)
*B01D 53/04* (2006.01)
(Continued)

(52) U.S. Cl.
CPC ......... *B01D 53/02* (2013.01); *B01D 53/0407* (2013.01); *B01D 53/0446* (2013.01);
(Continued)

(58) Field of Classification Search
CPC .......... F28F 3/08; F28D 9/0062; F24F 3/147; B01D 53/28; B01D 53/0407;
(Continued)

(56) References Cited

U.S. PATENT DOCUMENTS

2009/0263621 A1 10/2009 Chang et al.
2015/0291870 A1* 10/2015 Van Horn ............. C07F 15/065
556/113
(Continued)

FOREIGN PATENT DOCUMENTS

JP 200362424 A 3/2003
JP 200595883 A 4/2005
(Continued)

OTHER PUBLICATIONS

Zhao et al.; High-yield, fluoride-free and large-scale synthesis of MIL-101(Cr); Royal Society of Chemistry, Dalton Transactions; Aug. 19, 2015; No. 44; pp. 16791-16801.

*Primary Examiner* — Lionel Nouketcha
(74) *Attorney, Agent, or Firm* — The Webb Law Firm

(57) ABSTRACT

A humidity control element includes a plurality of flat plate members stacked in a state where a first flow path or a second flow path is formed in each space between the flat plate members. Heat is exchangeable between the first flow path and the second flow path via the flat plate members. Each of the flat plate members is formed of any one material of a resin, paper, glass, a metal, and a ceramic, a metal organic framework MIL-101 (Cr) containing chromium as a metal is held on any one of an inner surface of the first flow path and an inner surface of the second flow path, and a switching time between a dehumidification operation and a regeneration operation is relatively long.

5 Claims, 12 Drawing Sheets

(51) Int. Cl.
*B01D 53/26* (2006.01)
*B01J 20/22* (2006.01)
*B01J 20/28* (2006.01)
*B01J 20/34* (2006.01)
*F24F 3/147* (2006.01)
*F28F 3/08* (2006.01)
*B01D 53/02* (2006.01)

(52) U.S. Cl.
CPC .......... *B01D 53/261* (2013.01); *B01J 20/226* (2013.01); *B01J 20/28045* (2013.01); *B01J 20/3425* (2013.01); *B01J 20/3458* (2013.01); *F24F 3/147* (2013.01); *F28F 3/08* (2013.01); *B01D 2253/204* (2013.01); *B01D 2257/80* (2013.01); *B01D 2259/40086* (2013.01); *B01D 2259/4508* (2013.01)

(58) Field of Classification Search
CPC ... B01D 53/261; B01J 20/226; B01J 20/3425; B01J 20/22; B01J 20/34
See application file for complete search history.

(56) References Cited

U.S. PATENT DOCUMENTS

| | | |
|---|---|---|
| 2016/0084541 A1 | 3/2016 | Aguado et al. |
| 2016/0334145 A1 | 11/2016 | Pahwa et al. |

FOREIGN PATENT DOCUMENTS

| | | | |
|---|---|---|---|
| JP | 2005134097 A | | 5/2005 |
| JP | 2010512991 A | | 4/2010 |
| JP | 201175179 A | | 4/2011 |
| JP | 2013193046 A | | 9/2013 |
| JP | 2015529258 A | | 10/2015 |
| JP | 201715369 A | | 1/2017 |
| JP | 2017015369 A | * | 1/2017 |
| JP | 2017508121 A | | 3/2017 |
| JP | 2017150755 A | | 8/2017 |

* cited by examiner

HUMIDITY CONTROL ELEMENT AND METHOD FOR USING THE SAME

CROSS-REFERENCE TO RELATED APPLICATIONS

This application is the United States national phase of International Application No. PCT/JP2019/007237 filed Feb. 26, 2019, and claims priority to Japanese Patent Application No. 2018-064015 filed Mar. 29, 2018, the disclosures of which are hereby incorporated by reference in their entirety.

BACKGROUND OF THE INVENTION

Field of the Invention

The present invention relates to a humidity control element in which a plurality of flat plate members are stacked in a state where a first flow path through which a first fluid flows or a second flow path through which a second fluid flows is formed in each space between the flat plate members, the first flow path and the second flow path are set in a stacking direction of the flat plate members, heat is exchangeable between the first flow path and the second flow path via the flat plate member, and a dehumidifying flow path is formed in which a hygroscopic material adsorbing and desorbing moisture is held on any one of an inner surface of the first flow path and an inner surface of the second flow path; and a method for using this humidity control element.

Description of Related Art

Humidity control elements have been described in JP-A-2017-15369, and a technique of using the humidity control element in JP-A-2013-193043 and JP-A-2017-150755, for example.

One function of this type of air conditioning system is dehumidification, and in the humidity control element described in JP-A-2017-15369, a flow path in which a hygroscopic material is disposed is considered as a dehumidifying flow path. On the other hand, a flow path in which a hygroscopic material is not disposed is used as a temperature adjusting flow path for adjusting a temperature of the dehumidifying flow path.

Briefly explaining operations during dehumidification and regeneration operations of these flow paths, during the dehumidification operation, a fluid to be dehumidified is caused to flow through the dehumidifying flow path, and a cooling fluid for cooling the dehumidifying flow path (further, a hygroscopic material) is caused to flow through a pair of temperature adjusting flow paths. In this operation mode, a hygroscopic material absorbs moisture from the fluid to be dehumidified in a relatively high humidity state, and thus dehumidification can be performed. On the other hand, during the regeneration operation, the hygroscopic material provided in the dehumidifying flow path is in a hygroscopic state, and thus by causing a regenerating fluid having a relatively high temperature and low humidity to flow through this dehumidifying flow path, moisture can be released from the hygroscopic material to regenerate the hygroscopic material. Therefore, in the operations of this type of humidity control element, the dehumidification and regeneration operations are repeated at predetermined time intervals.

As the hygroscopic material provided in the dehumidifying flow path, in the related art, silica gel, zeolite, calcium chloride, a polymer sorbent material, and the like have been used. In JP-A-2013-193043, the inventors proposed a water-absorbing material composition and a method for producing a water-absorbing sheet when silica gel is used as a hygroscopic material. On the other hand, JP-A-2017-150755 proposes an air conditioning system having a new configuration, but in this air conditioning system, an example in which a sodium polyacrylate-based hygroscopic material is used as a hygroscopic material is described (paragraph [0039]).

In recent years, a metal organic framework (MOF) has attracted attention as a material having a high adsorption capacity. In particular, a metal organic framework (hereinafter, described as MIL-101 (Cr) or simply MIL-101) containing chromium as a metal is a material having a high adsorption capacity and high resistance to water deterioration (T. Zhao, S. K. Henninger et al., Dalton Trans., 2015, 44, 16791).

FIG. 12 shows water vapor adsorption amounts of MIL-101 (Cr) and a polymeric sorbent (specifically, sodium polyacrylate, which is simply described as a "sorbent" in the same drawing). A horizontal axis in the same drawing is relative humidity.

MIL-101 (Cr) is a material having high hygroscopicity, which has a water vapor adsorption amount of greater than 1.0 g/g per dry weight of a sample at relative humidity of 60% RH, a water vapor adsorption isotherm thereof shows a distinctive S-shape, and the water vapor adsorption amount (about 0.2 g/g) is low up to around 40% RH but the water vapor adsorption amount is rapidly increased in a range of 40% RH to 60% RH and reaches 1.0 g/g or greater. On the other hand, sodium polyacrylate has a feature in which a gentle upward curve is drawn in a wide range, and a water vapor adsorption amount thereof is not so high, as well.

In the same drawing, thick broken lines indicate a temperature and relative humidity when these materials are used as a hygroscopic material. For example, the thick broken lines correspond to cases of operating with a treating air (air to be dehumidified) at 30° C. and 60% RH and a regenerating air (air for regenerating the adsorbed water vapor) at 50° C. and 20% RH [assuming a case where an air at 30° C. and 60% RH is heated to 50° C.].

However, no attempt has been made to adapt to an air conditioning system in which the dehumidification and regeneration operations are performed by using the metal organic framework MIL-101 (Cr) containing chromium as a metal as a hygroscopic material. In this case, in the dehumidification and regeneration operations, it was not clear which switching time would be preferable to perform the operation, and how to set a dimension (specifically, a distance (hereinafter, referred to as an "element height") corresponding to a height of a surface of an element where an air flows in or flows out, and a flow path length (hereinafter, referred to as an "element depth") of a flow path) of the humidity control element in accordance with a suitable switching time.

SUMMARY OF THE INVENTION

A main object of the present invention is to obtain a humidity control element capable of maintaining a humidity control capability at a high level as a humidity control element used with dehumidification and regeneration operations; and a method for using the same.

A first feature configuration of the present invention is that a plurality of flat plate members are stacked in a state where a first flow path through which a first fluid flows or a second flow path through which a second fluid flows is formed in each space between the flat plate members, the first flow path and the second flow path are set in a stacking direction of the flat plate members, heat is exchangeable between the first flow path and the second flow path via the flat plate member, the flat plate member is formed of any one material of a resin, paper, glass, a metal, and a ceramic, or a composite material obtained by combining two or more materials selected from these materials, and a dehumidifying flow path is formed in which a metal organic framework MIL-101 (Cr) containing chromium as a metal is held, as a hygroscopic material adsorbing and desorbing moisture, on any one of an inner surface of the first flow path and an inner surface of the second flow path.

According to this feature configuration, by holding the metal organic framework MIL-101 (Cr) containing chromium as a metal, as a hygroscopic material, in the first flow path or the second flow path, this hygroscopic material can be held on a surface of a material forming the flow path to exhibit hygroscopicity.

That is, while dehumidification is performed by causing, for example, a high-humidity air, which is a fluid to be dehumidified, to flow through the flow path holding this hygroscopic material therein, the hygroscopic material can be regenerated by causing a high-temperature air to flow after completion of the dehumidification.

A feature configuration of a method for using the humidity control element according to the present invention with such dehumidification and regeneration is that in a dehumidification and regeneration switching operation of repeating a dehumidification operation in which a fluid to be dehumidified flows into the dehumidifying flow path and flows out from the dehumidifying flow path, and a regeneration operation in which a regenerating fluid flows into the dehumidifying flow path and flows out from the dehumidifying flow path are repeated, relating to a dehumidification amount of the dehumidifying flow path, and a switching time which is a switching interval of the dehumidification and regeneration switching operation, in terms of change characteristics of a dehumidification amount which is decreased according to an increase in the switching time, the switching time is set to the switching time at which the dehumidification amount falls between a maximum value of the dehumidification amount and a lower limit dehumidification amount which is a dehumidification amount reduced by 10% from the maximum value.

Regarding the present invention, results of an investigation conducted by the inventors will be described later, but even when the switching time in the dehumidification and regeneration switching operation in a case where MIL-101 (Cr) is used as a hygroscopic material is longer (for example, even when the switching time is a time of 60 seconds to 120 seconds) compared to a case where sodium polyacrylate is used as a hygroscopic material, the dehumidification amount is hardly decreased in the former case. Whereas, in the latter case, the dehumidification amount is greatly reduced (see FIGS. 4 and 9).

Meanwhile, this type of switching requires a switching operation of the flow path by a flow path switching mechanism (damper) provided on one or both of an upstream side and a downstream side of the humidity control element, but in consideration of an operation and a life of this type of flow path switching mechanism, it is preferable that the switching time is long.

When selection of the hygroscopic material is considered from such a viewpoint, in the case where MIL-101 (Cr) is used as a hygroscopic material, in terms of the change characteristics of the dehumidification amount which is decreased according to the increase in the switching time, it is possible to select a switching time at which the dehumidification amount is greater than the maximum value and a lower limit dehumidification amount which is a dehumidification amount reduced by 10% from the maximum value, but in the case where sodium polyacrylate is used as a hygroscopic material, such a switching time range is extremely limited, which is not practical, in fact.

As a result, in the humidity control element according to the present invention, relating to the dehumidification amount of the dehumidifying flow path and the switching time which is the switching interval of the dehumidification and regeneration switching operation, in terms of the change characteristics of the dehumidification amount which is decreased according to the increase in the switching time, even when the switching time is set to the switching time at which the dehumidification amount falls between a maximum value of the dehumidification amount and the lower limit dehumidification amount which is a dehumidification amount reduced by 10% from the maximum value, a high dehumidifying capacity can be favorably maintained while ensuring a long switching time, which is preferable.

A second feature configuration of the present invention is that relating to a dehumidification amount of the dehumidifying flow path in a dehumidification operation in which a fluid to be dehumidified flows into the dehumidifying flow path and flows out from the dehumidifying flow path, and an element height, in terms of change characteristics of a dehumidification amount which is increased and saturated according to an increase in the element height, the element height is set such that the dehumidification amount falls between a maximum value of the dehumidification amount and a lower limit dehumidification amount which is a dehumidification amount reduced by 10% from the maximum value.

As described above, even when the switching time is relatively long, the dehumidification amount of the humidity control element according to the present invention is not significantly decreased, but in such a use mode, a relationship between the element height and the dehumidification amount is as follows: in the case where MIL-101 (Cr) is used as a hygroscopic material, the element height can be reduced by about 60% to 80% compared to the case where sodium polyacrylate is used as a hygroscopic material, and even when the element height is selected in such a manner, in terms of the change characteristics of the dehumidification amount which is increased and saturated according to the increase in the element height, the maximum value of the dehumidification amount can fall between the maximum value and the lower limit dehumidification amount which is a dehumidification amount reduced by 10% from the maximum value (see FIGS. 5 and 10). Therefore, in a mode in which the height of the humidity control element is reduced, a desired dehumidifying capacity can be maintained.

A third feature configuration of the present invention is that relating to a dehumidification amount of the dehumidifying flow path in a dehumidification operation in which a fluid to be dehumidified flows into the dehumidifying flow path and flows out from the dehumidifying flow path, and a flow path depth which is a flow path length of the dehumidifying flow path, in terms of change characteristics of a dehumidification amount which is increased and saturated according to an increase in the flow path depth, a depth of the dehumidifying flow path is set to the flow path depth at which the dehumidification amount falls between a maximum value of the dehumidification amount and a lower limit dehumidification amount which is a dehumidification amount reduced by 10% from the maximum value.

As described above, even when the switching time is relatively long, the dehumidification amount of the humidity control element according to the present invention is not significantly decreased, but in such a use mode, a relationship between the element depth and the dehumidification amount is as follows: in the case where MIL-101 (Cr) is used as a hygroscopic material, the dehumidifying capacity can be maintained in a range where the element depth is shorter than that in the case where sodium polyacrylate is used as a hygroscopic material.

Therefore, in terms of the change characteristics of the dehumidification amount which is increased and saturated according to the increase in the element depth, the dehumidification amount falls between a maximum value of the dehumidification amount and the lower limit dehumidification amount which is a dehumidification amount reduced by 10% from the maximum value (see FIGS. 6 and 11). Therefore, in a mode in which the depth of the humidity control element is reduced, a desired dehumidifying capacity can be maintained.

A fourth feature configuration of the present invention is that the first flow path is configured as the dehumidifying flow path, the second flow path is configured as a temperature adjusting flow path for adjusting a temperature of the first flow path, and a flow direction of the second flow path is opposed to or orthogonal to a flow direction of the first flow path.

With this feature configuration, temperatures of a fluid to be dehumidified, which is a fluid flowing through the dehumidifying flow path, and MIL-101 as a hygroscopic material can be adjusted to a temperature at which favorable hygroscopicity can be exhibited, and thus the capability can be sufficiently exhibited.

In addition, by setting the flow direction to an opposing direction or an orthogonal direction, the humidity control element can be constructed with a relatively simple shape, and heat exchange required between both the flow paths can be favorably realized.

BRIEF DESCRIPTION OF THE DRAWINGS

FIG. 2 is a detailed cross-sectional diagram of the humidity control element shown in

FIG. 1.

DESCRIPTION OF THE INVENTION

An embodiment of a humidity control element E according to the present invention will be described with reference to the drawings.

As the embodiment, a first embodiment and a second embodiment will be described, but a difference between both embodiments is a difference in formation directions of a first flow path 20a and a second flow path 20b forming the humidity control element E. In the first embodiment, as is clear from FIG. 1, formation directions of flow paths 20 are parallel to each other, and in the second embodiment, as is clear from FIG. 7, the formation directions are orthogonal to each other. Therefore, in the following description, a structure of the humidity control element E mainly in the first embodiment will be described.

First Embodiment

Figure 1:
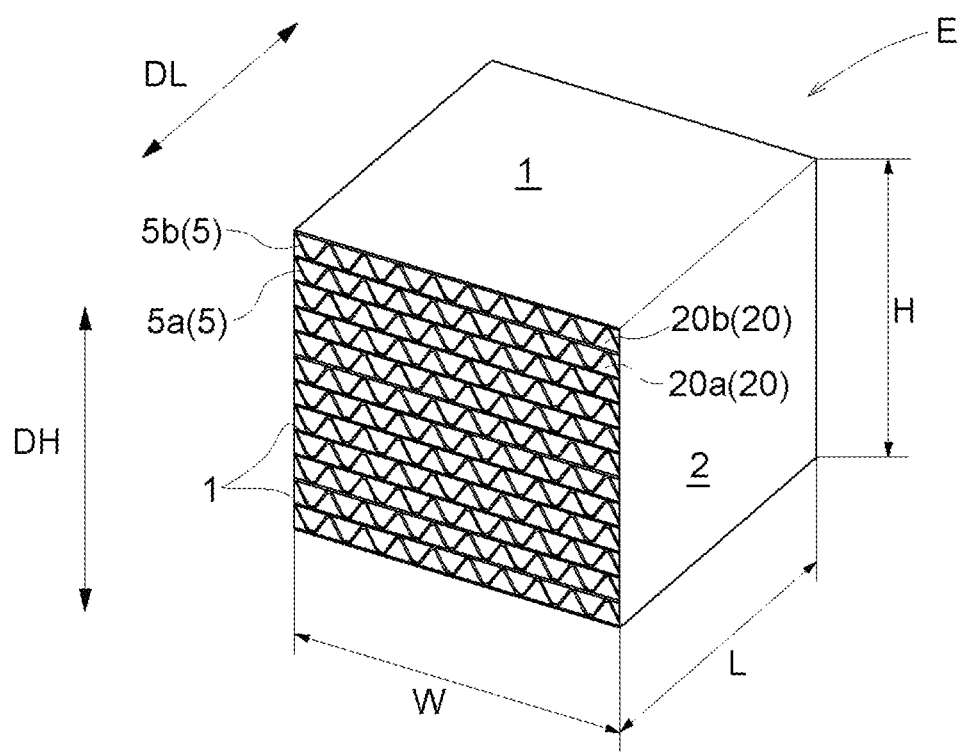
FIG. 1 is a diagram showing a structure of a humidity control element according to a first embodiment.
Figure 2:
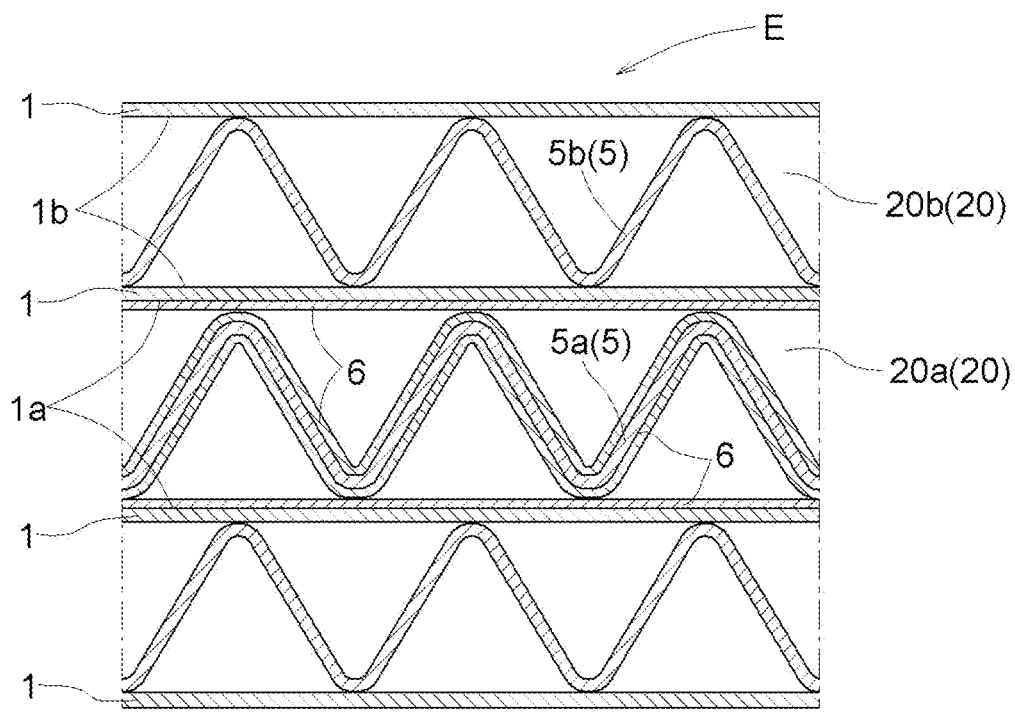

As shown in FIGS. 1 and 2, in the humidity control element E, a plurality of flat plate members 1 are stacked in a state where a flow path 20 through which a fluid flows is formed between the flat plate members 1.

The plurality of stacked flat plate members 1 are substantially rectangular flat plate materials which are formed long in a fluid flowing direction, and the flow path 20 which is long in the fluid flowing direction (a DL direction shown in FIG. 1) is formed between a pair of adjacent flat plate members 1. Furthermore, a side wall 2 which connects outer peripheral edges of a pair of adjacent flat plate members 1 in a stacking direction (a DH direction shown in FIG. 1) is provided, and a plurality of flow paths 20 are formed whose upper and lower surfaces are configured by the flat plate member 1 and whose side surface is configured by the side wall 2.

In the above description, the "element depth" is a flow path length L of the flow path 20 in the DL direction, and the "element height" is an element height H in the DH direction of a surface of the element where an air flows in or flows out.

That is, in the humidity control element E, the plurality of flat plate members 1 are stacked in a state where a first flow path 20a through which a first fluid flows or a second flow path 20b through which a second fluid flows is formed in each space between the flat plate members 1, the first flow path 20a and the second flow path 20b are alternately disposed in the stacking direction DH of the flat plate members 1, and heat is exchangeable between the first flow path 20a and the second flow path 20b via the flat plate member 1.

A shape of each flow path 20 is maintained, but each of corrugated plate members 5 is disposed between the flat plate members 1. That is, a first corrugated plate member 5a is disposed in the first flow path 20a, and a second corrugated plate member 5b is disposed in the second flow path 20b.

A vertex portion of a crest of a waveform and a bottom portion of a trough of the waveform which from the first corrugated plate member 5a and the second corrugated plate member 5b are respectively in contact with or adhere to two upper and lower flat plate members 1. That is, the first corrugated plate member 5a and the second corrugated plate member 5b function as spacers for keeping an interval between two upper and lower flat plate members 1 constant, and prevent the first flow path 20a and the second flow path 20b from being deformed or the like. Furthermore, heat is transferred inside the first flow path 20a and the second flow path 20b via the first corrugated plate member 5a and the second corrugated plate member 5b.

Figure 3:
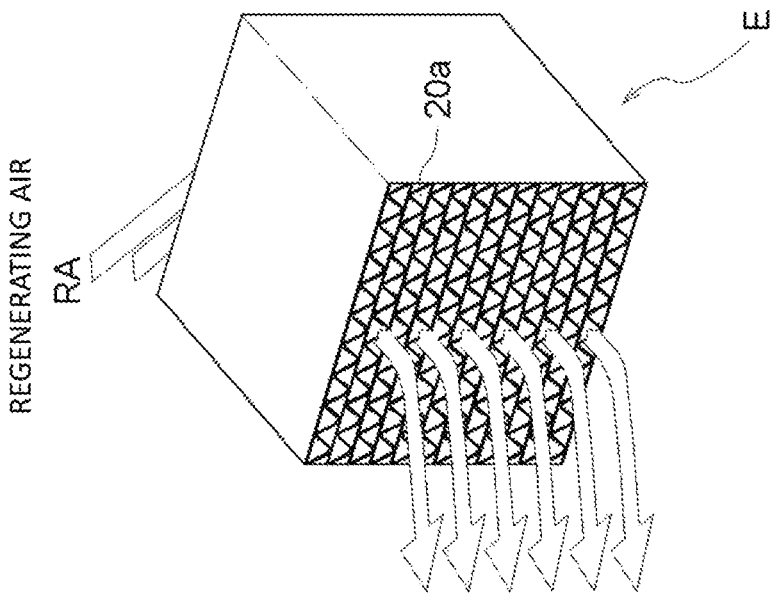
FIGS. 3(a) and 3(b) are explanatory diagrams of a dehumidification and regeneration switching operation of the humidity control element according to the first embodiment.
Figure 3:
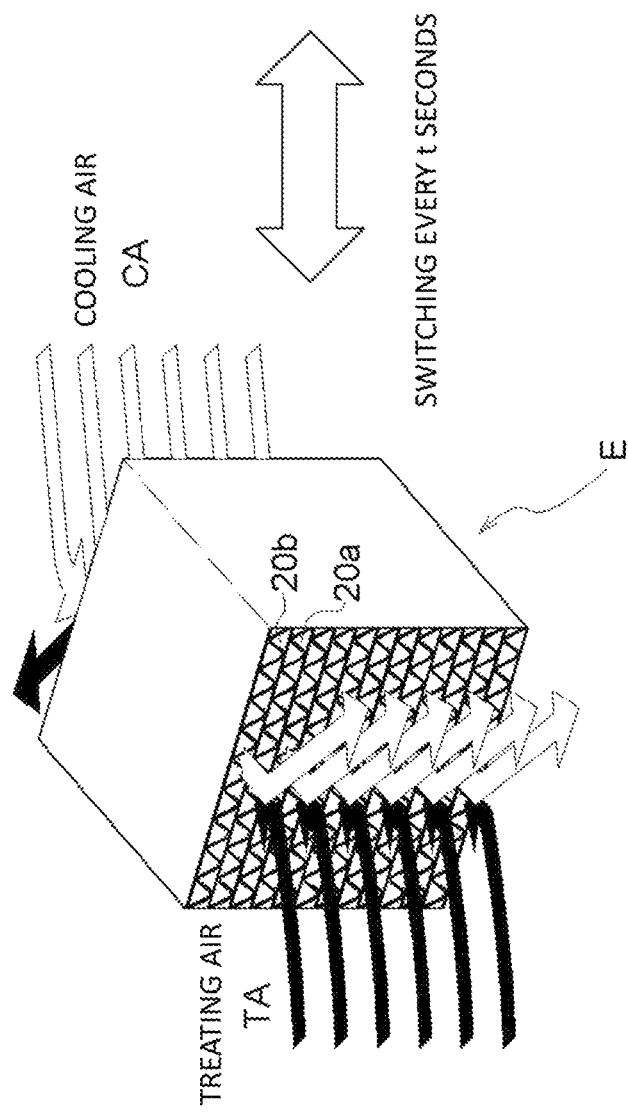

When this humidity control element E is used for dehumidification, in a dehumidification operation, as shown in FIG. 3(*a*), the first fluid (a treating air TA described later) and the second fluid (a cooling air CA) are circulated in a state where the first fluid and the second fluid form a counter flow via the flat plate member 1, and heat is exchanged between the first flow path 20a and the second flow path 20b. In the regeneration operation, as shown in FIG. 3(*b*), only the first fluid (a regenerating air RA described later) flows.

As shown in FIG. 2, a hygroscopic material 6 which adsorbs and desorbs moisture contained in the first fluid flowing through the first flow path 20a is held on each first surface 1a of the plurality of the flat plate members 1, which faces the first flow path 20a. Furthermore, the hygroscopic material 6 is also held on a surface of the first corrugated plate member 5a provided in the first flow path 20a, that is, an upper surface side and a lower surface side of the first corrugated plate member 5a. By adopting this configuration, a surface area of the first corrugated plate member 5a having a corrugated plate shape is large, and thus an amount of the hygroscopic material 6 which can be held on the surface of the first corrugated plate member 5a can be increased.

On the other hand, the hygroscopic material 6 is not held on each second surface 1b of the plurality of the flat plate members 1, which faces the second flow path 20b. The second corrugated plate member 5b is provided in this second flow path 20b, but the hygroscopic material 6 is also not held on an upper surface side and a lower surface side of this second corrugated plate member 5b. As a result, in the humidity control element E, this second corrugated plate member 5b performs functions of holding the shape and transferring heat.

In the present invention, as the hygroscopic material 6, a metal organic framework MIL-101 (Cr) containing Cr as a metal is used. When in use, for example, a mixed liquid obtained by mixing MIL-101 (Cr) with a polyacrylic polymer which is an acrylic polymer material functioning as a binder is applied to an inner surface (the first surface 1a of the first flow path 20a and the surface of the first corrugated plate member 5a which are described above) of the first flow path 20a, subjected to a drying treatment, and held on the inner surface of the first flow path 20a. Here, it is preferable that the mixed liquid to be applied contains a slight amount of a urethane-based polymer material as a thickener.

Proportions of MIL-101 (Cr) as the hygroscopic material 6, the acrylic polymer material as a binder, and the urethane-based polymer material as a thickener can be such that, when the total solid content thereof is 100% by mass, MIL-101 (Cr) is 58% by mass to 80% by mass, the urethane-based polymer material is 1% by mass to 2% by mass, and the remainder is the acrylic polymer material.

The flat plate member 1, the corrugated plate member 5, and the side wall 2 are preferably formed of a resin material having a polarity close to that of the binder or the hygroscopic material 6 and having heat resistance. This is because when the hygroscopic material 6 is held on the flat plate member 1 and the corrugated plate member 5 (the first corrugated plate member 5a) by using a binder, these three members have favorable adhesiveness. For example, the inventors have found that polyethylene terephthalate (PET) is most preferable as such a material.

However, this usage example is merely an example of a case where the metal organic framework MIL-101 (Cr) containing Cr as a metal is used as the hygroscopic material 6, and the binder may be used as described above, or MIL-101 (Cr) may be held at a predetermined position of the humidity control element E. That is, a method for holding MIL-101 (Cr) in the humidity control element E is optional.

On the other hand, as a constituent material of the flat plate member 1, a resin, a metal, paper, glass, and a ceramic can be adopted.

Hereinbefore, the schematic structure of the humidity control element according to the present invention has been described, but with reference to FIGS. 3(*a*) and 3(*b*), a switching operation when the dehumidification operation and the regeneration operation are performed using the humidity control element according to the present invention will be described.

In the present specification, a fluid (for example, a treating air TA having high humidity) to be dehumidified is referred to as a "dehumidifying fluid", and a flow path through which this fluid flows is referred to as a "dehumidifying flow path". The dehumidifying flow path is a flow path (the first flow path 20a) on a side where the hygroscopic material 6 is held. A fluid (for example, a cooling air CA having a relatively low temperature) for cooling this dehumidifying flow path (specifically, the fluid to be dehumidified flowing through this flow path and the hygroscopic material 6 which absorbs moisture from the fluid) is referred to as a "cooling fluid", and a flow path through which this fluid flows is referred to as a "temperature adjusting flow path". This flow path is the second flow path 20b, and the temperature adjustment is specifically cooling.

Furthermore, in the regeneration operation, a fluid which flows through the dehumidifying flow path 20a and releases moisture from the hygroscopic material 6 in a hygroscopic state to regenerate (regeneration of a state capable of absorbing moisture) the hygroscopic material 6 is referred to as a "regenerating fluid". Due to the function thereof, the regenerating fluid (for example, a regenerating air RA having a relatively high temperature) is naturally circulated through the dehumidifying flow path 20a at a timing different from that during the dehumidification operation.

FIG. 3(*a*) shows the fluids flowing through the respective flow paths during the dehumidification operation. When the fluid is an air, during this dehumidification operation, the treating air TA which is the fluid to be dehumidified is caused to flow through the dehumidifying flow path (the first flow path 20a), and the cooling air CA which is the cooling fluid is caused to flow through the temperature adjusting flow path (the second flow path 20b). In the illustrated example, a relationship between the flow directions of both the fluids is a counter flow. In this way, the hygroscopic material 6 absorbs humidity from the fluid to be dehumidified.

FIG. 3(b) shows the fluids flowing through the respective flow paths during the regeneration operation. This operation is an operation performed after the dehumidification operation is completed. When the fluid is an air, during this regeneration operation, the regenerating air RA which is the regenerating fluid is caused to flow through the dehumidifying flow path (the first flow path 20a). Nothing is done with respect to the temperature adjusting flow path (the second flow path 20b). In this way, moisture is released from the hygroscopic material 6 to the regenerating fluid side, and the hygroscopic material 6 is regenerated into a state capable of absorbing moisture.

The humidity control element E according to the present invention switches the dehumidification operation and the regeneration operation at predetermined time intervals (in FIG. 3, described as "SWITCHING EVERY t SECONDS").

Second Embodiment

Figure 7:
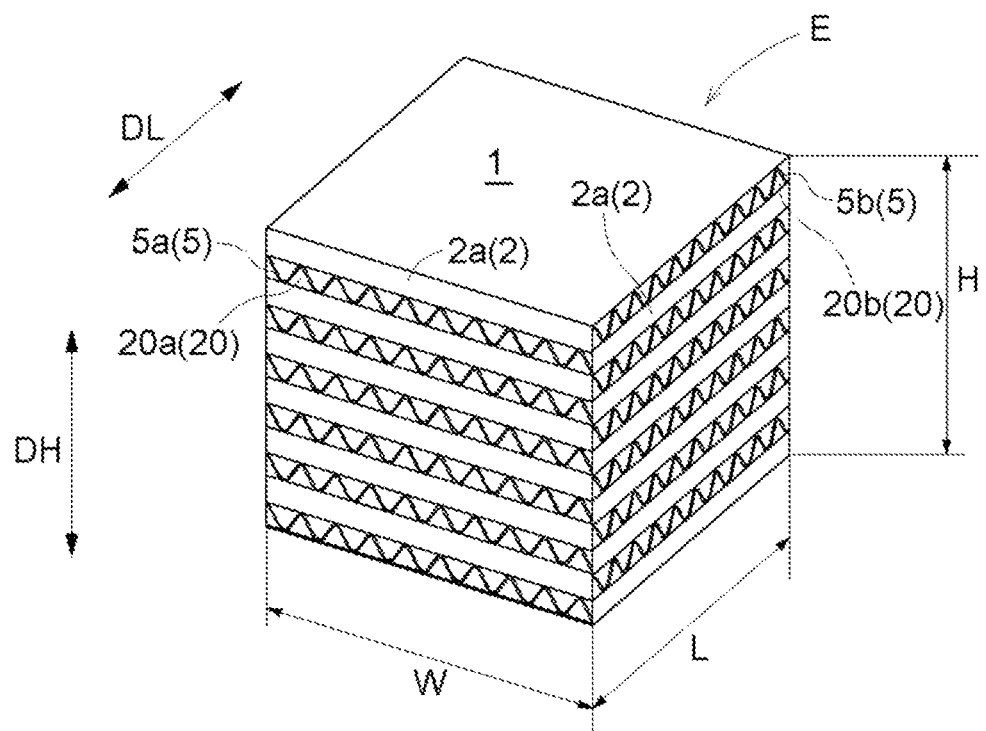
FIG. 7 is a diagram showing a structure of a humidity control element according to a second embodiment.

An overall configuration of the humidity control element E according to this embodiment is shown in FIG. 7, and a dehumidification and regeneration switching operation thereof is shown in FIGS. 8(a) and 8(b). These drawings correspond to FIG. 1 and FIGS. 3(a) and 3(b) of the first embodiment.

As is clear from FIG. 7, the formation directions of the first flow path 20a and the second flow path 20b are orthogonal to each other. Therefore, a side wall 2 is provided such that a side wall plate 2a for the first flow path 20a and a side wall plate 2b for the second flow path 20b are separately formed. Selection and switching of the fluid and the flow path when the dehumidification and regeneration switching operation is performed are the same also in this second embodiment.

FIG. 8(a) shows the fluids flowing through the respective flow paths during the dehumidification operation. When the fluid is an air, during this dehumidification operation, the treating air TA which is the fluid to be dehumidified is caused to flow through the dehumidifying flow path (the first flow path 20a), and the cooling air CA which is the cooling fluid is caused to flow through the temperature adjusting flow path (the second flow path 20b). In the illustrated example, a relationship between the flow directions of both the fluids is a counter flow. In this way, the hygroscopic material 6 absorbs humidity from the fluid to be dehumidified.

FIG. 8(b) shows the fluids flowing through the respective flow paths during the regeneration operation. This operation is an operation performed after the dehumidification operation is completed. When the fluid is an air, during this regeneration operation, the regenerating air RA which is the regenerating fluid is caused to flow through the dehumidifying flow path (the first flow path 20a). Nothing is done with respect to the temperature adjusting flow path (in this example, the second flow path 20b). In this way, moisture is released from the hygroscopic material 6 to the regenerating fluid side, and the hygroscopic material 6 is regenerated into a state capable of absorbing moisture.

Figure 8:
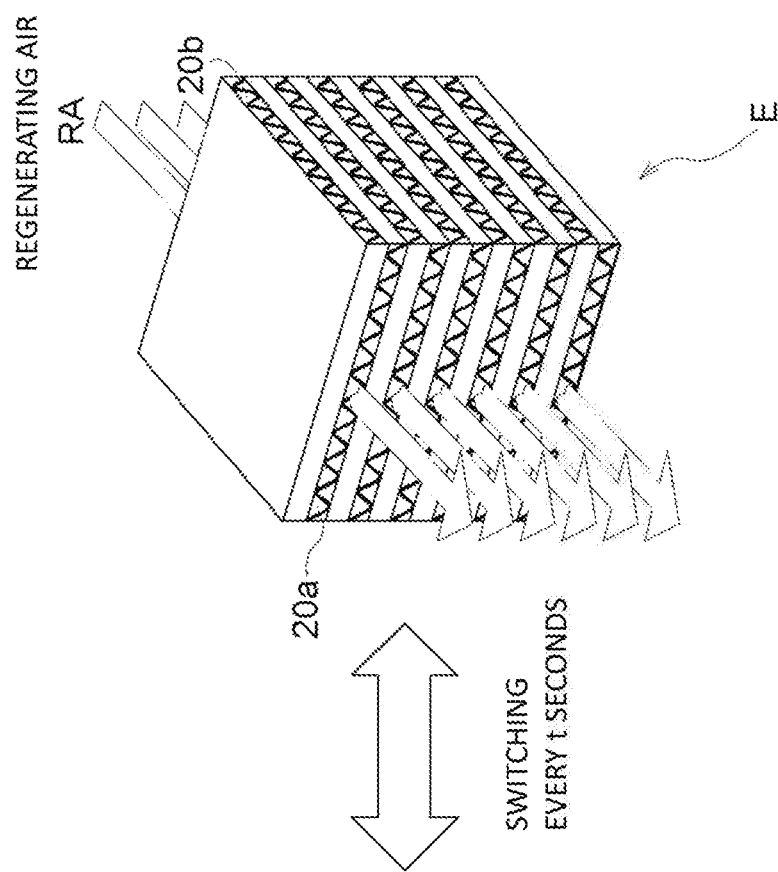
FIGS. 8(a) and 8(b) are explanatory diagrams of a dehumidification and regeneration switching operation of the humidity control element according to the second embodiment.
Figure 8:
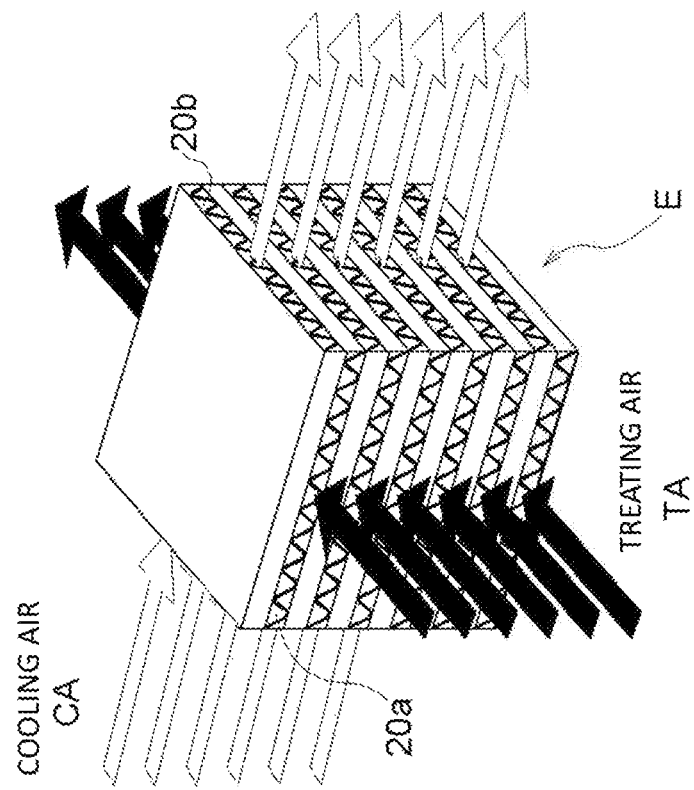

The dehumidification operation and the regeneration operation are repeated at predetermined time intervals (in FIG. 8, described as "SWITCHING EVERY t SECONDS").

As described above, as an operation mode of this humidity control element E, dehumidification and regeneration switching accompanying the dehumidification operation and the subsequent regeneration operation is basically used.

Therefore, when the structure and the method for using the humidity control element E according to the present invention are investigated, it is necessary to determine a time interval at which this switching operation is performed.

In the investigation, as the hygroscopic material 6, the metal organic framework MIL-101 (Cr) containing chromium as a metal, which is adopted in the present invention, and the polymeric sorbent (sodium polyacrylate) were compared and investigated under the following conditions.

<Investigation Method>

The investigation was performed by numerical calculation with physical properties of each hygroscopic material 6 as shown in Table 1 below under the following common conditions for test calculation. In this numerical calculation, a dehumidification amount obtained in the entire humidity control element E was calculated by dividing the entire humidity control element E into 20 or more meshes in one direction, and by performing calculation of water vapor transfer and heat transfer for each mesh (constituted of the dehumidifying flow path 20a through which the treating air TA or the regenerating air RA flows, the temperature adjusting flow path 20b through which the cooling air CA flows, and the corrugated plate member 5 [a predetermined amount of the hygroscopic material 6 was carried on the treating air TA or regenerating air RA side of the corrugated plate member 5] for classifying these flow paths) while integrating meshes. However, in this numerical calculation, for simplicity, the calculation was performed on the assumption that the corrugated plate member 5 was not present. That is, the hygroscopic material is held only by the first surface 1a, and only the flat plate member 1 contributes to heat transfer.

<Common Conditions for Test Calculation>

In the following description of conditions, "basic" means that this condition is followed unless otherwise specified.

Basic dimension of humidity control element: width W×depth L×height H=200×200×200 mm Stacking pitch: 2.5 mm Application thickness of hygroscopic material: 0.020 mm Thickness of corrugated plate member: 0.050 mm Density of corrugated plate member: 2.688 g/cm$^3$ Specific heat of corrugated plate member: 0.905 kJ/(kg·K)

Thermal conductivity of corrugated plate member: 237 W/(m·K)

Basic air volume of treating air: 40 m$^3$/h

Basic air volume of cooling air: 80 m$^3$/h

Basic air volume of regenerating air: 40 m$^3$/h

Temperature and humidity of treating air: 30° C., 16.0 g/kg (60% RH)

Temperature of cooling air: 30° C.

Temperature and humidity of regenerating air: 50° C., 10.5 g/kg (assuming that indoor air in summer at 27° C. and 47% RH is heated)

Prandtl number of air: 0.71

Kinematic viscosity coefficient of air: $1.58\times10^{-5}$ m$^2$/s

Diffusion coefficient of air: $2.19\times10^{-5}$ m$^2$/s

<Conditions of Hygroscopic Material>

Figure 12:
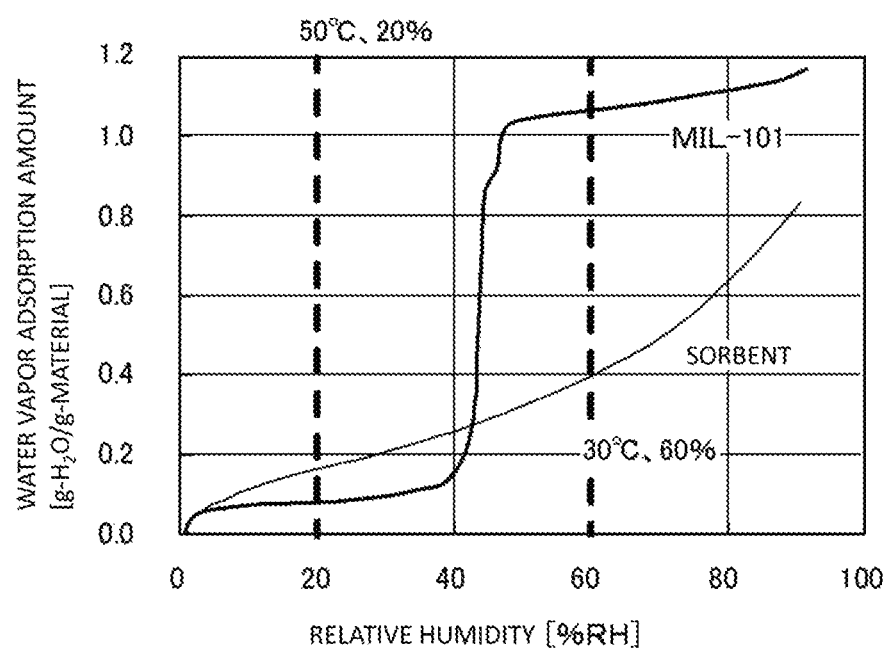
FIG. 12 is a graph showing water vapor adsorption amounts of MIL-101 (Cr) and a polymeric sorbent.

The physical properties of the hygroscopic materials 6 to be investigated, such as the metal organic framework MIL-101 (Cr) containing chromium as a metal and sodium polyacrylate, which is a polymeric sorbent, are numerical values shown in Table 1 below, and for a water vapor adsorption isotherm for the numerical calculation, a graph obtained by reversing a X axis and a Y axis of the water vapor adsorption isotherm shown in FIG. 12 was used by fitting with a quintic equation.

TABLE 1

| Item | Polymeric sorbent | MIL-101 |
|---|---|---|
| Thermal conductivity [W/(m · K)] | 0.085 | 0.120 |
| Density [kg/m$^3$] | 470 | 775 |
| Specific heat [J/(kg · K)] | 1400 | 1250 |
| Hygroscopic heat [kJ/kg-H$_2$O] | 2430 | 2557 |

Figure 4:
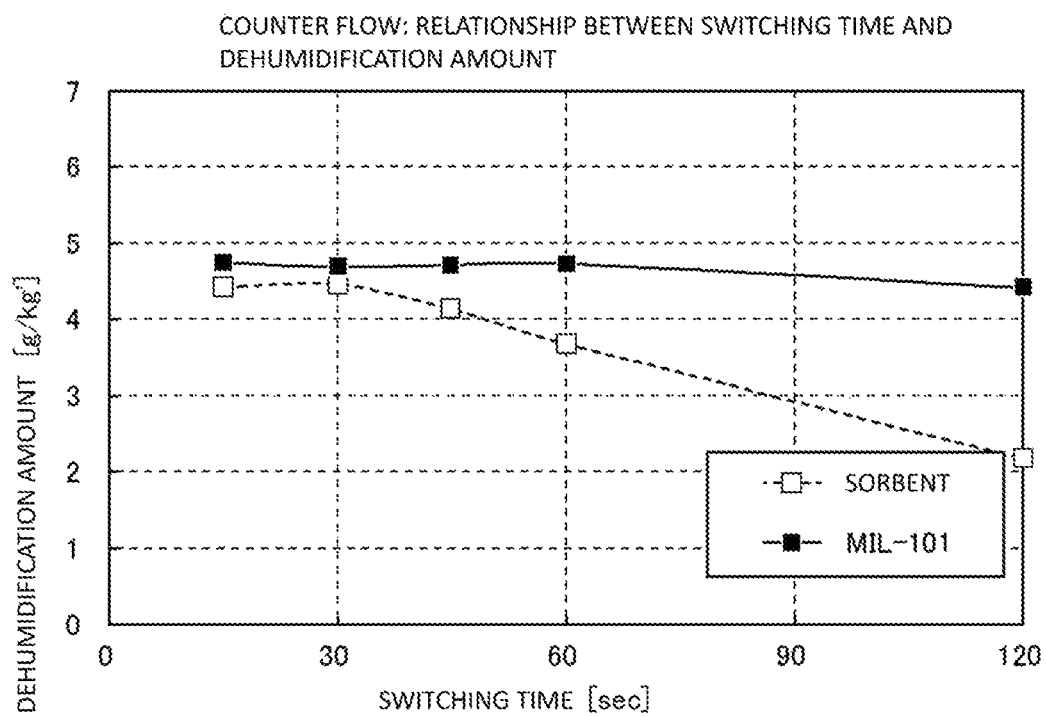
FIG. 4 is a graph showing a relationship between a switching time and a dehumidification amount of the humidity control element according the first embodiment.
Figure 5:
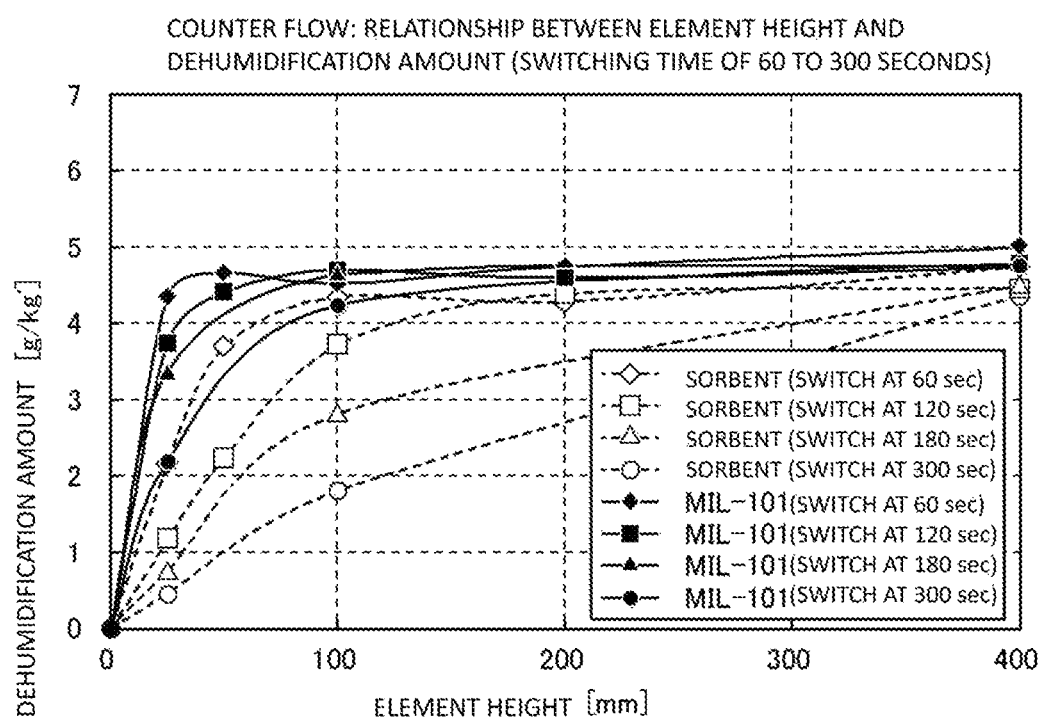
FIG. 5 is a graph showing a relationship between an element height and a dehumidification amount of the humidity control element according the first embodiment.
Figure 6:
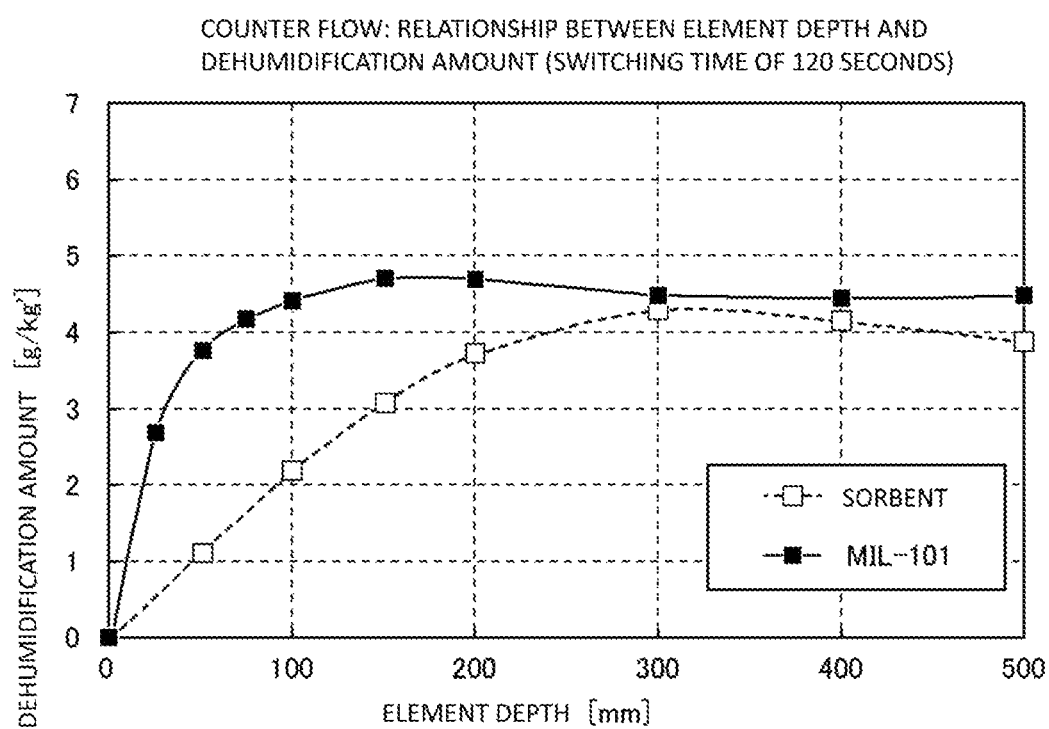
FIG. 6 is a graph showing a relationship between an element depth and a dehumidification amount of the humidity control element according the first embodiment.
Figure 9:
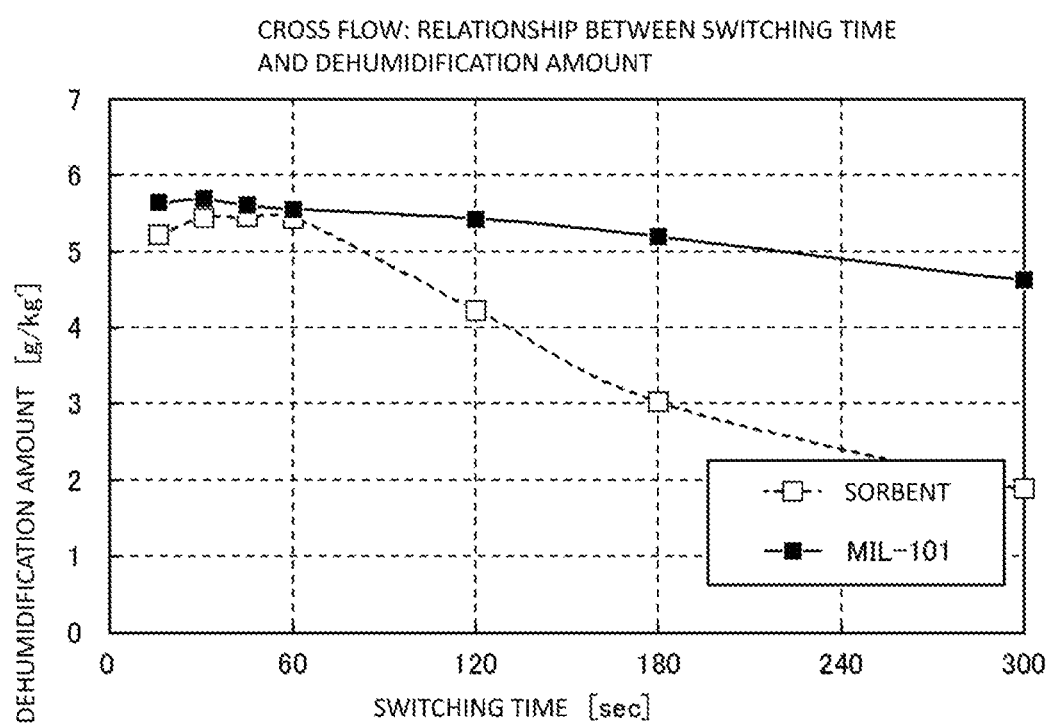
FIG. 9 is a graph showing a relationship between a switching time and a dehumidification amount of the humidity control element according the second embodiment.
Figure 10:
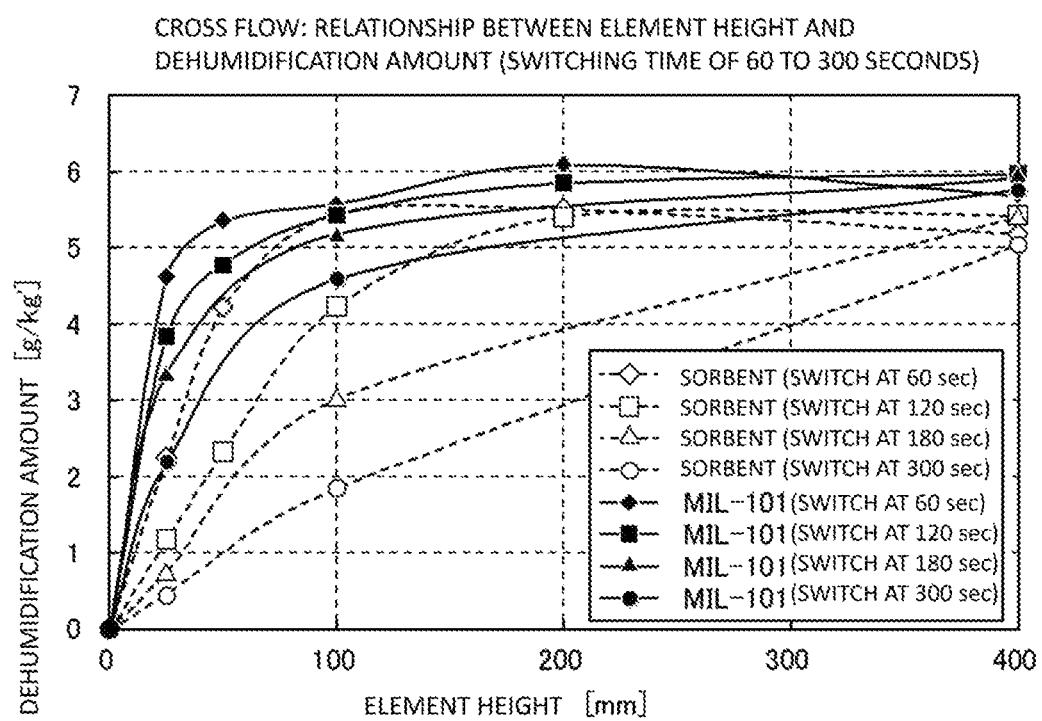
FIG. 10 is a graph showing a relationship between an element height and a dehumidification amount of the humidity control element according the second embodiment.
Figure 11:
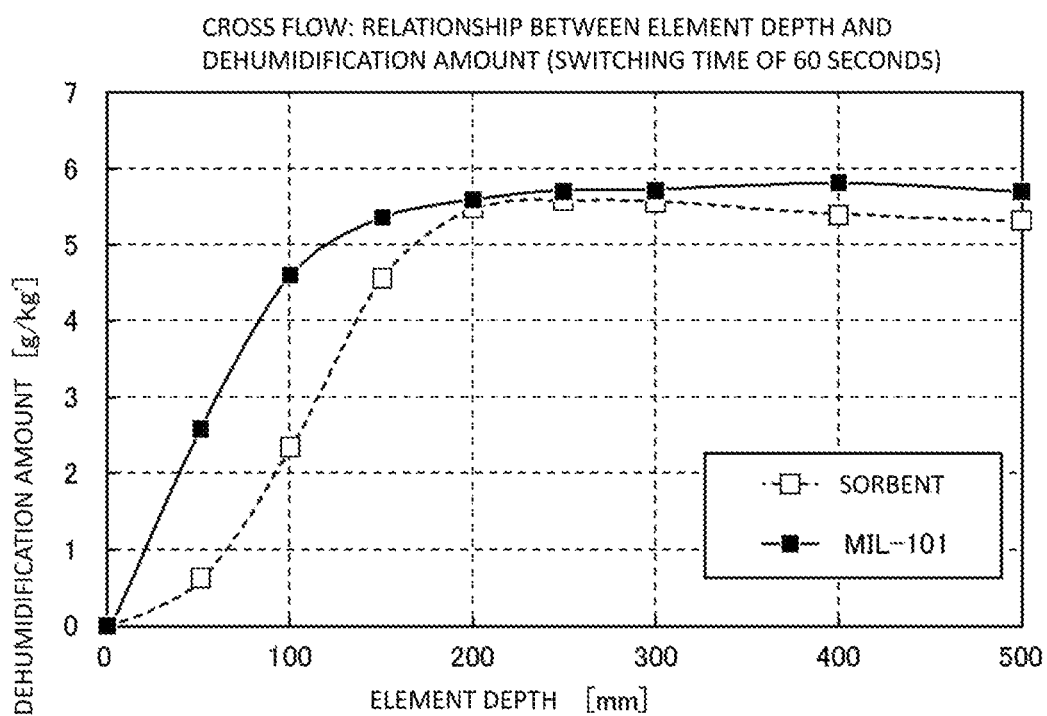
FIG. 11 is a graph showing a relationship between an element depth and a dehumidification amount of the humidity control element according the second embodiment.

Investigation Results Investigation results of the first embodiment are shown in FIGS. 4, 5, and 6, and investigation results of the corresponding second embodiment are shown in FIGS. 9, 10, and 11. In these drawings and FIG. 12, for the hygroscopic material 6 provided in the humidity control element E, the metal organic framework MIL-101 (Cr) containing Cr as a metal is described as "MIL-101" (the same shall apply in the following description based on the drawings), and the polymeric sorbent (sodium polyacrylate) is simply described as a "sorbent".

First Embodiment

The investigation results are results of a case where, in the humidity control element E shown in FIG. 1, the dehumidification operation was performed by circulating the treating air TA and the cooling air CA as a counter flow and then the regeneration operation was performed with the regenerating air RA, as shown in FIG. 3(*b*).

Switching Time FIG. 4 shows a relationship between the switching time and the dehumidification amount. In any of the hygroscopic materials 6, as the switching time is shorter, the dehumidification amount is greater, and the dehumidification amount is always greater in MIL-101. Even when the switching time is long, in MIL-101, the dehumidification amount is less likely to decrease. Whereas, in the polymeric sorbent, the dehumidification amount is rapidly reduced. It can be inferred that this is because a region having humidity in which MIL-101 effectively acts is increased due to the cooling effect. Furthermore, from such a tendency, it is clear that the polymeric sorbent which has been proposed in the related art requires a short switching time, and for example, when a switching time of 120 seconds is selected, the capability cannot be sufficiently exhibited.

Element Height

FIG. 5 shows a relationship between the element height and the dehumidification amount when the switching time is 60 to 300 seconds.

In terms of each switching time, it can be seen that when the same amount of the dehumidification amount is obtained between the hygroscopic materials 6 to be investigated, the element height can be reduced by about 60% to 80% by adopting MIL-101. The inventors consider that an effect of miniaturization is great as described above because the temperature of the treating air TA is kept low due to the presence of the cooling air CA and a region having humidity in which MIL-101 effectively acts is relatively increased.

FIG. 6 shows a relationship between the element depth L and the dehumidification amount when the switching time is 120 seconds. In a region where the element depth L is 200 mm or less, when the same amount of the dehumidification amount is obtained between the hygroscopic materials 6 to be investigated, it is possible to reduce the size by about 70% to 80% by adopting MIL-101. Moreover, it is considered that a decrease in the dehumidification amount at a great element depth L is affected by dehumidification in an upstream of a depth direction and slightly humidification in a downstream. It is not preferable to make the element depth longer than necessary. However, also in this case, a degree of the decrease is lower in MIL-101.

Second Embodiment

The investigation results are results of a case where, in the humidity control element E shown in FIG. 7, the dehumidification operation was performed by circulating the treating air TA and the cooling air CA as a cross flow and then the regeneration operation was performed with the regenerating air RA, as shown in FIG. 8(*b*).

Switching Time

FIG. 9 shows a relationship between the switching time and the dehumidification amount. In any of the hygroscopic materials, as the switching time is shorter, the dehumidification amount is greater, and the dehumidification amount is always greater in MIL-101. In MIL-101, even when the switching time is long, the dehumidification amount is less likely to decrease. It can be inferred that this is because a region having humidity in which MIL-101 effectively acts is increased due to the cooling effect.

Element Height

FIG. 10 shows a relationship between the element height and the dehumidification amount when the switching time is 60 to 300 seconds.

In terms of each switching time, it can be seen that when the same amount of the dehumidification amount is obtained between the hygroscopic materials to be investigated, the element height can be reduced by about 60% to 80% by adopting MIL-101. The inventors consider that an effect of miniaturization is great as described above because the temperature of the treating air TA is kept low due to the presence of the cooling air CA and thus a region having humidity in which MIL-101 effectively acts is relatively increased.

In comparison with the first embodiment, a great dehumidification amount was obtained as a whole.

FIG. 11 shows a relationship between the element depth L and the dehumidification amount when the switching time is 60 seconds. In a region where the element depth L is 200 mm or less, when the same amount of the dehumidification amount is obtained between the hygroscopic materials to be investigated, it is possible to reduce the size by about 20% to 60% by adopting MIL-101. Moreover, a degree of the decrease in the dehumidification amount at a great element depth L is smaller than that in the first embodiment.

Relating to the switching time, in terms of the change characteristics of the dehumidification amount which is decreased according to the increase in the switching time, by setting the switching time to the switching time at which the dehumidification amount falls between a maximum value of the dehumidification amount and the lower limit dehumidification amount which is a dehumidification amount reduced by 10% from the maximum value, a high dehumidifying capacity can be ensured.

Relating to the element height, in terms of the change characteristics of the dehumidification amount which is increased and saturated according to the increase in this element height, by setting the element height of the dehumidifying flow path to the element height at which the dehumidification amount falls between a maximum value of the dehumidification amount and a lower limit dehumidification amount which is a dehumidification amount reduced by 10% from the maximum value, a high dehumidifying capacity can be ensured.

In addition, relating to the element depth, in terms of the change characteristics of the dehumidification amount which is increased and saturated according to the increase in the flow path depth which is this element depth, by setting the depth of the dehumidifying flow path to the flow path depth at which the dehumidification amount falls between a maximum value of the dehumidification amount and a lower limit dehumidification amount which is a dehumidification amount reduced by 10% from the maximum value, a high dehumidifying capacity can be ensured.

Another Embodiment (1) In the above embodiments, as the constituent material of the flat plate member 1, briefly, a resin, a metal, paper, glass, and a ceramic are mentioned, but as the resin, polyethylene terephthalate, polyethylene, polypropylene, polystyrene, polyethylene naphthalate, and acryl can be adopted. On the other hand, as the metal, aluminum and copper are also preferable.

Furthermore, instead of using each material alone, a composite material obtained by combining two or more materials selected from these materials may be used. In this case, layers of different materials (for example, the resin and the metal) can be overlapped each other so that the hygroscopic material is held on the resin side and a heat transfer performance is ensured on the metal side.

(2) In the above embodiments, the embodiment in which the humidity control element is formed in a rectangular shape in a top view thereof is shown, but an outer shape is optional for reasons such as the configuration of the air conditioning system.

Furthermore, structures and directions of inflow and outflow positions of the fluid can be optionally selected.

(3) In the above embodiments, an example in which the second flow path is provided along an outer wall of the humidity control element is shown, but the first flow path may be formed along the outer wall.

The invention claimed is:

1. A humidity control element comprising:
a plurality of flat plate members that are stacked in a state where a first flow path through which a first fluid flows is formed in a space between a pair of the plurality of the flat plate members and a second flow path through which a second fluid flows is formed in a space between another pair of the plurality of the flat plate members,
wherein the first flow path and the second flow path are set in a stacking direction of the flat plate members,
heat is exchangeable between the first flow path and the second flow path via the flat plate members,
each of the plurality of flat plate members is formed of any one material of a resin, paper, glass, a metal, and a ceramic, or a composite material obtained by combining two or more materials selected from these materials, and
a dehumidifying flow path is formed by applying a mixed liquid comprising a metal organic framework MIL-101 (Cr) containing chromium as a hygroscopic material adsorbing and desorbing moisture, an acrylic polymer material functioning as a binder, and a urethane-based polymer material as a thickener on any one of an inner surface of the first flow path and an inner surface of the second flow path,
wherein proportions of MIL-101 (Cr) as the hygroscopic material, the acrylic polymer material, and the urethane-based polymer material are, when a total solid content thereof is 100% by mass, MIL-101 (Cr) is 58% by mass to 80% by mass, the urethane-based polymer material is 1% by mass to 2% by mass, and a remainder is the acrylic polymer material.

2. The humidity control element according to claim 1,
wherein relating to a dehumidification amount of the dehumidifying flow path in a dehumidification operation in which a fluid to be dehumidified flows into the dehumidifying flow path and flows out from the dehumidifying flow path, and an element height in the stacking direction,
in terms of change characteristics of a dehumidification amount which is increased and saturated according to an increase in the element height,
the element height is determined such that the dehumidification amount falls between a maximum value of the dehumidification amount and a lower limit dehumidification amount which is a dehumidification amount reduced by 10% from the maximum value.

3. The humidity control element according to claim 1,
wherein relating to a dehumidification amount of the dehumidifying flow path in a dehumidification operation in which a fluid to be dehumidified flows into the dehumidifying flow path and flows out from the dehumidifying flow path, and a flow path depth which is a flow path length of the dehumidifying flow path,
in terms of change characteristics of a dehumidification amount which is increased and saturated according to an increase in the flow path depth,
a depth of the dehumidifying flow path is set to the flow path depth at which the dehumidification amount falls between a maximum value of the dehumidification amount and a lower limit dehumidification amount which is a dehumidification amount reduced by 10% from the maximum value.

4. The humidity control element according to claim 1,
wherein the first flow path is configured as the dehumidifying flow path and the second flow path is configured as a temperature adjusting flow path for adjusting a temperature of the first flow path, and
a flow direction of the second flow path is opposed to or orthogonal to a flow direction of the first flow path.

5. A method for using the humidity control element according to claim 1, comprising:
in a dehumidification and regeneration switching operation of repeating a dehumidification operation in which a fluid to be dehumidified flows into the dehumidifying flow path and flows out from the dehumidifying flow path, and a regeneration operation in which a regenerating fluid flows into the dehumidifying flow path and flows out from the dehumidifying flow path,
relating to a dehumidification amount of the dehumidifying flow path, and a switching time which is a switching interval of the dehumidification and regeneration switching operation,
in terms of change characteristics of a dehumidification amount which is decreased according to an increase in the switching time,
setting the switching time to the switching time at which the dehumidification amount falls between a maximum value of the dehumidification amount and a lower limit dehumidification amount which is a dehumidification amount reduced by 10% from the maximum value.

* * * * *